United States Patent Office 3,376,116
Patented Apr. 2, 1968

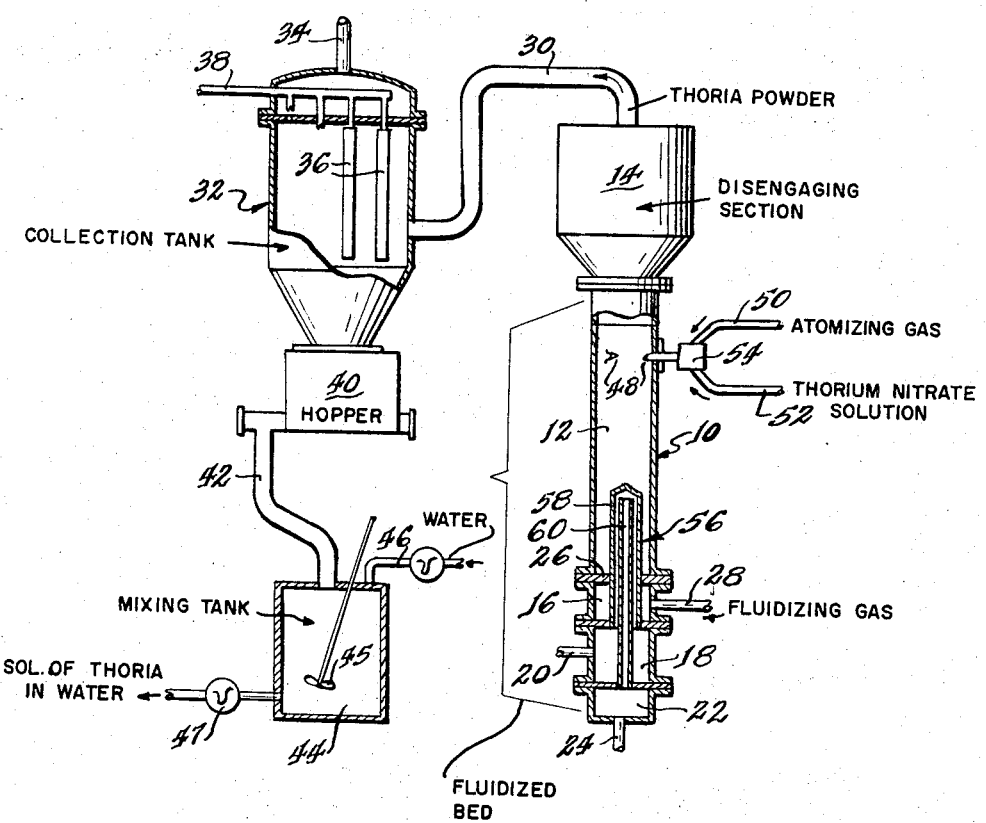

3,376,116
FLUID BED DENITRATION OF
THORIUM NITRATE
Wilbert J. Robertson, Overland, and Gerrald E. Kerr, St. Louis, Mo., assignors, by mesne assignments, to the United States of America as represented by the United States Atomic Energy Commission
Filed Feb. 6, 1967, Ser. No. 614,782
8 Claims. (Cl. 23—345)

ABSTRACT OF THE DISCLOSURE

A process for the thermal denitration of thorium nitrate in a fluid bed reactor by spraying thorium nitrate solution on a heated fluidized bed of dense, high-fired thorium dioxide.

Contractual origin of the invention

The invention described herein was made in the course of, or under, a contract with the United States Atomic Energy Commission.

This invention relates to a method for converting thorium nitrate to thorium dioxide or thoria. More specifically it relates to a method for denitrating thorium nitrate to thoria in a fluidized bed reactor.

Background of the invention

Present technology has developed a method for making dense shapes of thorium dioxide, suitable for use in nuclear reactors, by a method known as the sol-gel process. In this process a sol is first produced by mixing the thorium dioxide with water after adjustment to a particular pH with nitric acid. The sol is then dried to a gel in a large gas-fired open pot while undergoing agitation. After the gel has been formed, it is densified by firing in an inductively heated graphite crucible to a temperature between 950° and 1150° C. depending upon the method of denitration used to produce the thoria.

In order to produce thoria shapes of high density, it is important that the light thoria from which the sol is made be of the proper purity and particle size.

The denitration of thorium nitrate is presently accomplished by the pot denitration method which is a batch process. In this method a large volume of suitably concentrated aqueous thorium nitrate solution is placed into the denitration pot which is a large open kettle and heated to the temperature necessary to cause denitration while agitating the solution for a period of from 5 to 8 hours, depending upon the size of the denitration pot being used. The thoria is removed from the pot either by a pneumatic system or by hand for further processing and the pot then refilled with concentrated thorium nitrate solution to start another batch.

This method of thorium denitration works well, but has a number of problems associated with it. For example, there is a health hazard to operating personnel because of the dust and fumes which are very dangerous and which, as produced by this process, are very fine. The gas velocity in the fume duct must be very carefully controlled so that the product dust is neither allowed to puff out into the work area nor is lost by entrainment in the gas stream. The ingestion of thorium oxide is much more detrimental to health than the ingestion of the uranium oxides.

Another problem associated with the pot denitration process is the lack of good temperature control. Variations in the terminal denitration temperature will cause variations in the crystallite size of the product and also in the residual nitrate and water content. This nonuniformity can cause problems in the subsequent steps of the sol-gel process and make it more difficult to produce a uniformly dense product.

A still further problem results from contamination of the thorium dioxide by air during the unloading operation of the denitration pot. The thorium dioxide absorbs carbon dioxide from the air which has a detrimental effect upon the quality of the subsequently produced sol.

A solution to these problems would be the use of a fluidized bed reactor in which contamination by air could be eliminated and in which good terminal temperature control could be maintained. A problem associated with the use of a fluid bed reactor is the chance of product contamination through carry-over by the off-gas of some fine fluid bed material. This could be eliminated if it were possible to fluidize the same material as the product obtained so that any carry-over would not result in contamination.

An attempt at fluidized bed denitration of thorium nitrate using thorium dioxide as fluid bed material was reported in ORNL-2875 which discussed work done at Oak Ridge National Laboratory. The fluid bed denitration attempted there used a nitrogen-air mixture to fluidize irregular sintered thoria agglomerates which were used as the fluid bed material at temperatures of 500 to 600° C. The report stated that the thoria agglomerates were not easily fluidized and that this increased the probability of cake formation within the bed, which resulted in sudden temperature drops in the top of the bed. The report also stated that much better results were obtained by using classified sea sand as the fluid bed material than by use of the thoria.

We have discovered that, by using a dense high-fired thoria as the fluidized bed material, we are able to prevent bed caking and prevent great temperature drops and are able to maintain a stable fluidized reactor bed upon which we are able to denitrate thorium nitrate to thoria which is of excellent quality for use in the sol gel process. We have also developed a method of producing thoria sol without exposing the thoria to the atmosphere.

Accordingly, it is an object of this invention to provide a method for denitrating thorium nitrate without contaminating the product.

It is another object of this invention to provide a method of denitrating thorium nitrate in a fluidized bed reactor.

It is still another object of this invention to provide a stable bed of thorium dioxide in a fluidized bed reactor.

Summary of the invention

The method of this invention comprises spraying an aqueous solution of thorium nitrate into a fluidized bed reactor which has densified thoria as the fluid bed material so that any carry-over of bed material will not cause contamination of the product. It is assumed that denitration of liquid droplets of thorium nitrate occurs on the surface of the hot bed particles and that these newly formed denitrated particles are entrained in the off-gas stream and carried into the product collection system. The fluidizing gas used is steam with nitrogen as a purge. The finely powdered thoria, as it is produced, is entrained by the off gas and transported into a filter section. In the filter section the powdered thoria is trapped on a sintered metal filter which permits escape of the gas. The filters are equipped with a gas blow-back to remove the thoria and deposit it in the product collection system. The thoria may then either be packaged in a product container or it can be sent directly into a sol tank to be mixed with water before removal for further processing.

Reference is now made to the drawing which is a schematic view of an apparatus which has been used to practice this invention. It must be realized that the method of this invention is not limited to this apparatus but can include any apparatus by which the invention can be practiced.

Brief description of the drawing

The apparatus consists of a column 10, which includes a reaction section 12 which is 10 inches in diameter, a disengaging section 14 of enlarged diameter, and a gas inlet section 16. Connected to the bottom of gas inlet section 16 is a heating medium inlet header 18 provided with an inlet line 20 and a heating medium outlet header 22 provided with an outlet line 24. A gas distribution plate 26 separates reaction section 12 from gas inlet section 16.

A gas inlet pipe 28 leads to gas inlet section 16, while an off-gas line 30 connects the top of of the disengaging section 14 of column 10 with product collection system 32. Gases from the filter section exit to a fume scrubber through gas line 34. Product collection system 32 contains a plurality of sintered metal filters 36 to each of which is a nitrogen blow-back line 38 to prevent powder impaction. A seal hopper 40 engages the lower section of the collection system 32 and is connected by a thoria pipe 42 to sol tank 44 which contains an agitator 45, a water inlet 46 and an outlet 47 for product removal.

Solution to be denitrated is fed to the column through one or more atomizing spray nozzles 48 which penetrate the reactor section 12 of column 10 near the top of the fluidized bed level. A gas inlet 50 and a feed inlet 52 are connected to a nozzle body 54 for each nozzle 48.

The reactor contains an internal molten salt heater, consisting of a plurality of heater tubes 56, each containing an outer tube 58 which is open to heating medium inlet header 18 and an inner tube 60 which is open to heating medium outlet header 22 at the lower end and open to outer tube 58 at the upper end. A complete description of this heating system may be found in assignee's U.S. Patent No. 3,174,834, issued Mar. 23, 1965.

Description of the preferred embodiment

The fluidized bed material which was found to fluidize best was a dense high-fired thoria which had been produced from the sol-gel process. The bed material used for the first run was −40 mesh high-fired thoria; however, this material proved to be a little too coarse for the best fluidization characteristics and all subsequent runs were made using −50 mesh material. The first few runs were observed to have poor heat transfer. This was caused by the elutriation from the bed of the finer particle fraction which decreased the bed volume and degraded the fluidization characteristics of the bed. It is important to maintain both proper bed level and proper bed composition and the addition of the disengaging section 14 above the bed solved this problem.

The last several runs were made using this disengaging section which allowed the bed to become self-sustaining as the amount of bed material which was originally present was increased, making the addition of seed material no longer necessary.

Steam is the preferred fluidizing gas to be used with the method of this invention. It is necessary that the thoria as it is produced be protected from air and in particular from contamination by $CO_2$. The use of steam thus provides an artificial atmosphere to protect from $CO_2$. It had been found previously that oxides from denitration in a steam atmosphere are more readily dispersed than oxides produced in an inert atmosphere.

Steam as the fluidizing gas is also useful to help heat the reactor to the required temperature. For this reason superheated steam is used in temperatures of from 700 to 800° F.

The rate of steam flow is dependent upon the particle size of the fluid bed. The linear velocity of the fluidizing gas must also be sufficient to carry the fine thoria, which is formed in the reactor bed, through the disengaging section and into the filter cone 32. With the particle size as given above, it was found that by using 35 to 43 lbs./hr. of steam it was possible to maintain a well fluidized bed and still retain sufficient velocity to carry the fine thoria formed into the filter section.

Nitrogen gas is used to atomize the thorium nitrate solution as it enters the reaction chamber. With the fluid bed reactor used to practice this invention, nitrogen gas flow of from 2 to 3 s.c.f.m. was entirely satisfactory.

The concentration of thorium nitrate solution which was found to work most efficiently was from 7.0 to 8.0 pounds of thorium nitrate per gallon. A smaller concentration than this was operative but required the vaporization of a large quantity of water before denitration could take place, thus decreasing the efficiency of the bed. It was also found, however, that when the solution contained a concentration of over 8 pounds of thorium nitrate per gallon, nozzle plugging became a problem which necessitated fluid bed shut-down.

The rate at which the thorium nitrate feed could be sprayed into the reactor is again a function of the ability of the reactor to maintain the temperature necessary for denitration. For the reactor used in the examples described herein, a feed rate of 11.5 to 14.3 gallons per hour was found to be satisfactory.

Reactor temperature must be high enough to ensure that complete denitration takes place. It was found that any temperature above 650° F. was satisfactory for this purpose. The greater the temperature the faster the reaction would proceed, since the heat must first remove the surplus water before denitration could commence. Due to equipment limitations, the reactor used to practice this invention was limited to 800° F.

The general operating procedure to produce the thoria was as follows. The fluid bed material was loaded into the reactor. This was the dense, high-fired thorium dioxide of which 550 pounds was required to fill the reactor used to practice this invention. After the bed was loaded, it was preheated to operating temperature with hot fluidizing gas and by circulating hot molten salt through the internal heaters. When the bed reached operating temperature, water was introduced into the spray nozzle to cool it. After feeding water for a short period, thorium nitrate solution was substituted. The feed rate and atomizing air pressure were then adjusted to the desired values.

The detailed conditions of each run are summarized in Table I.

TABLE I.—OPERATING CONDITIONS FOR FLUID BED DENITRATION OF THORIUM NITRATE

| | Run Number | | | | | | | | | |
|---|---|---|---|---|---|---|---|---|---|---|
| | 1 | 2 | 3 | 4 | 5 | 6 | 7 | 8 | 9 | 10 |
| Feed Concentration, lbs. Th/gal | 7.4 | 7.5 | 7.6 | 7.5 | 7.4 | 7.6 | 7.7 | 7.6 | 7.7 | 8.0 |
| Feed Rate, gal./hr | 12 | 12.9 | 13.5 | 13.5 | 14.3 | 14.3 | 14.0 | 11.5 | 12.9 | 13.7 |
| Feed Rate, lbs. Th/hr | 89 | 97 | 103 | 101 | 106 | 109 | 108 | 88 | 99 | 110 |
| Atomizing $N_2$, s.c.f.m | 2.0 | 2.0 | 2.0 | 3.0 | 3.0 | 3.0 | 3.0 | 3.0 | 2.5 | 2.5 |
| Fluidizing Steam, lbs./hr | 35 | 35 | 37 | 37 | 39 | 37 | 36 | 36 | 43 | 43 |
| Reactor Temperature, °F | 800 | 790 | 780 | 755 | 730 | 690 | 670 | 705 | 795 | 770 |
| Salt Temperature, °F | 980 | 970 | 950 | 935 | 910 | 885 | 860 | 870 | 935 | 925 |
| ΔT (Salt, Reactor), °F | 180 | 180 | 170 | 180 | 180 | 195 | 190 | 165 | 140 | 155 |

The thorium dioxide crystallite size of 45–60 A. produced by the fluidized bed was found to be somewhat smaller than that produced by the pot process, which averaged from 90–120 A. This is important because it has been found that the smaller crystallite-size material will sinter at lower temperatures. By sintering at lower temperatures, better temperature control can be maintained, which results in a more uniform product. The use of lower temperatures also permits the use of conventional resistance furnaces.

The quality of the thorium dioxide produced in run No. 8 is shown in Table II.

TABLE II

| Sample Number | LOI at 1,050° C., percent | Crystallite Size, A. | Nondispersible, ml./100 ml. of 4 M ThO$_2$ Sol | pH of 4 M ThO$_2$ Sol |
|---|---|---|---|---|
| 1 | 3.6 | 67 | <1 | 3.4 |
| 2 | 3.9 | 71 | <1 | 3.4 |
| 3 | 3.7 | 67 | <1 | 3.2 |
| 4 | 3.8 | ---- | <1 | 3.3 |
| 5 | 4.6 | 63 | <1 | 3.2 |
| 6 | Lost | ---- | Lost | ---- |
| 7 | 5.6 | 50 | <1 | 2.5 |
| 8 | 6.8 | ---- | <1 | 2.6 |
| 9 | 5.1 | 53 | <1 | 2.4 |
| 10 | 4.6 | ---- | Coagulated | ---- |

It is to be understood that the invention is not to be limited to the details given herein but that it may be modified within the scope of the appended claims.

The embodiments of the invention in which an exclusive property or privilege is claimed are defined as follows:

1. A method of producing light thoria in a fluid bed reactor comprising: establishing and maintaining a fluidized bed of dense high-fired thorium dioxide, heating said bed to at least 650° F., spraying an aqueous solution of thorium nitrate into said heated bed whereby light thoria is formed in said bed and collecting said light thoria.

2. The method of claim 1 wherein said aqueous solution of thorium nitrate contains 6.0 to 8.0 pounds of thorium nitrate per gallon of solution.

3. The method of claim 1 wherein the bed is fluidized by steam at 700 to 800° F. at a rate of from 35 to 42 lbs./hour.

4. The method of claim 1 wherein the dense high-fired thorium dioxide is no greater than 420 microns in diameter.

5. A method of producing dense thoria comprising: establishing and maintaining a fluidized bed of dense high-fired thoria particles prepared by the sol-gel process by passing steam upwardly therethrough, heating the bed to at least 650° F., spraying an aqueous solution of thorium nitrate into said bed whereby light thoria is formed in said bed and entrained in the off-gas stream, collecting said light thoria and forming a sol of said light thoria and water without exposing the thoria to the atmosphere, drying the sol to a gel, densifying the thoria gel by firing at a temperature of 950° C. to 1150° C., and recycling a portion of the so-formed dense high-fired thoria back to the fluidized bed.

6. The method of claim 5 wherein the aqueous solution of thorium nitrate contains 6.0 to 8.0 pounds of thorium nitrate per gallon of solution.

7. The method of claim 5 wherein the bed is fluidized by steam at 700 to 800° F. at a rate of from 35 to 42 lbs./hour.

8. The method of claim 5 wherein the dense high-fired thorium dioxide is no greater than 420 microns in diameter.

References Cited

UNITED STATES PATENTS 3,228,886   1/1966   Lloyd _____ 23—345
3,334,974   8/1967   Fletcher et al. _____ 23—345

OTHER REFERENCES

NSA 14–6208, Comparison of a Fluidized Bed and an Agitated Through Chemical Reactor for Producing ThO$_2$ From Th(NO$_3$)$_4$; S. D. Clinton, February 1960.

NSA 16–14617, Chemical Technology Division, Unit Operations Section Monthly Progress Report, Whatley et al., December 1961.

NSA 13–3064, The Metal Thorium, H. A. Wilhelm, March 1959.

CARL D. QUARFORTH, *Primary Examiner.*

L. DEWAYNE RUTLEDGE, *Examiner.*

M. J. McGREAL, *Assistant Examiner.*